United States Patent [19]
Shoham

[11] Patent Number: 5,855,015
[45] Date of Patent: Dec. 29, 1998

[54] SYSTEM AND METHOD FOR RETRIEVAL OF HYPERLINKED INFORMATION RESOURCES

[75] Inventor: Yoav Shoham, Palo Alto, Calif.

[73] Assignee: Interval Research Corporation, Palo Alto, Calif.

[21] Appl. No.: 440,206

[22] Filed: May 12, 1995

Related U.S. Application Data

[63] Continuation-in-part of Ser. No. 406,681, Mar. 20, 1995, abandoned.

[51] Int. Cl.$^6$ ..................................................... G06F 17/30
[52] U.S. Cl. .................................. 707/5; 707/4; 707/501
[58] Field of Search ..................................... 395/601, 602, 395/603, 604, 605, 606; 707/4, 5, 6, 3

[56] References Cited

U.S. PATENT DOCUMENTS

| | | | |
|---|---|---|---|
| 4,839,853 | 6/1989 | Deerwester et al. | 707/5 |
| 5,408,655 | 4/1995 | Oren et al. | 707/501 |
| 5,446,891 | 8/1995 | Kaplan et al. | 707/2 |
| 5,488,725 | 1/1996 | Turtle et al. | 707/5 |
| 5,530,852 | 6/1996 | Meske, Jr. et al. | 395/200.36 |

OTHER PUBLICATIONS

De Bra P., and Post, R., "Information Retrieval in the World–Wide Web: Making Client Based Searching Feasible." Computer Networks and ISDN Systems, vol. 12, No. 2, pp. 183–192, Nov. 1994.

Internet Resource Discovery Services, K. Obraczka, P. Danzig, S. Li, University of California, pp. 8–22, no date.

A Vector Space Model for Automatic Indexing, Commun. ACM Journal, G. Salton, C.S. Yang, A. Wong, vol. 18, No. 11, pp. 613–620, Nov. 1975.

Compound Document Processing System, S. Al–Hawamdeh, C.J.C. Loke, Institute of Syst. Sci., Nat. Univ. of Singapore, Proceedings of the Fifteenth Annual International Computer Software and Applications Conference, pp. 640–944, 1991.

"Harvest: A Scalable, Customizable Discovery and Access System", C. Mic Bowman, et al, Technical Report CU–CS–732–94, Dept. of Computer Science, Univ.of Colorado–Boulder, Aug. 26, 1994.

"Using Collaborative Filtering to Weave an Information Tapestry", David Goldberg, et al, *Communications of the ACM*, Dec., 1992, vol. 35, No. 12, pp. 61–70.

"Learning Representative Exemplars of Concepts: An Initial Case Study", D. Kibler and D. Aha; in *Proceedings of the 4th International Workshop on Machine Learning*, 1987.

"Collaborative Interface Agents", Y. Lashkari, et al; In *Proceedings of the 12th National Conference on Artificial Intelligence*, 1994.

"Learning Interface Agents", P. Maes and R. Kozierok; In *Proceedings of the 11th National Conference on Artificial Intelligence*, 1993.

"Web agent Related Research at the Center for Machine Translation", M. Mauldin and J. Leavitt; In *Proceedings of the ACM Special Interest Group on Networked Information Discovery and Retrieval*, Aug., 1994.

(List continued on next page.)

*Primary Examiner*—Thomas G. Black
*Assistant Examiner*—Jack M. Choules
*Attorney, Agent, or Firm*—Brooks & Kushman P.C.

[57] ABSTRACT

A system and method for adaptively traversing a network of linked textual or multi-media information utilizes one or more heuristics to explore the network and present information to a user. An exploration or search heuristic governs activity while examining and exploring the linked information resources, while a presentation heuristic controls presentation of a manageable amount of information resources to the user. The system and method accept relevance feedback from the user which is used to refine future search, retrieval, and presentation of information resources. The user may present an information query of various degrees of specificity or the system and method may search and present information resources based entirely on relevance feedback from the user.

38 Claims, 3 Drawing Sheets

OTHER PUBLICATIONS

"Finding What People Want: Experiences with the Web-Crawler", Brian Pinkerton; In *The Second International WWW Conference: Mosaic and the Web*, 1994.

"Relevance Feedback in Information Retrieval", J.J. Rocchio, Jr.; *The Smart System—Experiments in Automatic Document Processing*, pp. 313–323, Prentice Hall, Inc., Englewood Cliffs, NJ (1971).

"Term Weighting Approaches in Automatic Text Retrieval", G. Salton and C. Buckley; Technical Report 87–881, Cornell University, Department of Computer Science, Nov. 1987.

"Improving Retrieval Performance by Relevance Feedback", G. Salton and C. Buckley; Technical Report 88–898 Cornell University, Department of Computer Science, Feb. 1988.

"SIFT—A Tool for Wide–Area Information Dissemination", T. Yan and H. Garcia–Molina; In *Proceedings of the USENIX Technical Conference*, Jan. 1995.

SYSTEM AND METHOD FOR RETRIEVAL OF HYPERLINKED INFORMATION RESOURCES

CROSS-REFERENCE TO RELATED APPLICATIONS

This is a continuation-in-part of U.S. patent application Ser. No. 08/406,681, filed Mar. 20, 1995, entitled "System And Method For Retrieval Of Hyperlinked Information Resources" now abandoned.

TECHNICAL FIELD

The present invention relates to a system and method for retrieval of hyperlinked information resources.

BACKGROUND ART

The information explosion has provided an ever-increasing amount and variety of available information to users of varying sophistication. However, the systems and methods for locating information of interest to a particular user, have generally failed to afford comprehensive information access while minimizing the complexity of the user interface, and presentation of spurious results. This pertains to information-finding tasks of various kinds, including answering a particular query, and casually browsing or surfing for information of interest in the absence of a crisply articulated query.

Many information retrieval systems and methods focus primarily on selecting information based on a formatted query. The particular format often varies significantly from one system to the next depending upon the particular type of information and the structure of the information database. These approaches assume the existence of a collection of information and a user-specified query, with the task being to find those documents which satisfy the query. A significant amount of research and development relating to information retrieval has focused on techniques for determining the degree of similarity between "information units", i.e. a sentence, document, file, graphic, image, sound bite, or the like, herein collectively referred to as information resources, or between the user query and an information resource. As the amount of information in the collection grows, the number of resources which are similar to the query will likely grow as well. As a result, it becomes necessary to make queries increasingly more precise so that the system will return a manageable number of results. It is therefore desirable for a system and method to facilitate sophisticated query construction without requiring an unreasonable amount of time or effort to be expended by the user.

One powerful approach to this problem utilizes a technique referred to as relevance feedback. In a system employing relevance feedback, a few resources that are determined to be interesting, or similar to a user query, are presented to the user who provides feedback to the system pertaining to the relevance of the resources. The user feedback is used to update the query, in an attempt to generate increasingly more precise queries resulting in retrieval of increasingly more relevant resources. A variety of implementations of the general technique of relevance feedback are possible, depending upon the particular structure of the query, the structure of the information, and the method for updating the query based on the feedback.

One approach to assisting users in locating information of interest within a collection is to add structure to the collection. For example, information is often sorted and classified so that a large portion of the collection need not be searched. However, this type of structure often requires some familiarity with the classification system, to avoid elimination of relevant resources by improperly limiting the search to a particular classification or group of classifications.

Another approach used to locate information of interest to a user, is to couple resources through cross-referencing. Conventional cross-referencing of publications using citations provides the user enough information to retrieve a related publication, such as the author, title of publication, date of publication, and the like. However, the retrieval process is often time-consuming and cumbersome. A more convenient, automated method of cross-referencing related documents utilizes hypertext or hyperlinks. Hyperlink systems allow authors or editors to embed links within their resources to other portions of those resources or to related resources in one or more collections which may be locally accessed, or remotely accessed via a network. Users of hypermedia systems can then browse through the resources by following the various links embedded by the authors or editors. These systems greatly simplify the task of locating and retrieving the documents when compared to a traditional citation since the hyperlink is usually transparent to the user. Once selected, the system utilizes the embedded hyperlink to retrieve the associated resource and present it to the user, typically in a matter of seconds. The retrieved resource may contain additional hyperlinks to other related information which can be retrieved in a similar manner.

A hypermedia collection may be represented by a directed graph having nodes which represent resources and arcs which represent embedded links between resources. Typically, a user interface, such as a browser, is utilized to access hyperlinked information resources. The user interface displays information "pages" or segments and provides a mechanism by which that user may follow the embedded hyperlinks. Many user interfaces allow selection of hyperlinked information via a pointing device, such as a mouse. Once selected, the system retrieves the information resource corresponding to the embedded hyperlink.

As hyperlinked information networks become more ubiquitous, they continue to grow in complexity and magnitude, often containing hundreds of thousands of hyperlinked resources. Hyperlinked networks may be centralized, i.e. exist within a single computer or application, or distributed, existing over many computers separated by thousands of kilometers. These networks are typically dynamic and evolve over time in two dimensions. First, the information content of some resources may change over time, so that following the same link at different times may lead to a resource with slightly different, or entirely different information. Second, the very structure of the networked information resources may change over time, the typical change being the addition of documents and links. The dynamic nature of these networks has significant ramifications in the design and implementation of modern information retrieval systems.

One example of a distributed, dynamic hyperlinked network is known as the World-Wide Web (herein referred to as "the Web"). The Web is a recently developed hyperlinked network of information available on the internet which facilitates retrieval and presentation of information resources utilizing standard presentation (HyperText Markup Language or HTML) and transfer protocols (HyperText Transfer Protocol or HTTP). A number of user interfaces have been developed which accommodate these protocols so that information may be retrieved and presented to users regardless of their particular location or computer equipment.

Information available on the Web is the product of thousands of authors creating "pages" of information resources containing embedded hyperlinks to other resource pages deemed to be of interest by the authors or editors. At any time, an author can add a node to the Web by creating a new resource and making it accessible to other users on the network. The new resource is added to the system by embedding corresponding links within existing resources which point to the new resource. The new resource may also contain its own embedded links to related existing resources.

Another example of a hyperlinked information network is the INTERCHANGE online network. This network is a privately owned information service having hyperlinked documents. A somewhat related system distributed by Lotus Development Corporation, LOTUS NOTES, provides mechanisms for linking between local or remotely accessible documents, and might be considered a hypertext system. Similarly, the LEXIS/NEXIS legal research system supplied by Reed Elsevier utilizes a form of hyperlinking to automatically retrieve legal documents which are cited within the text of a reported case. Many companies have implemented internal hyperlinked information systems which are not publicly accessible. These systems may be utilized by customer-assistance personnel or for direct sale and use by customers. In addition, many computer application programs utilize local hyperlinked information systems to implement on-line help functions.

Traditional information search and retrieval techniques have been applied to hyperlinked information networks. One direct approach utilizing standard information retrieval techniques consists of systematically exploring the network and generating a catalog, index, or map of links associated with documents containing information of interest. This index is then used to retrieve the relevant information based on a user query without employing the hyperlinked structure.

This approach is difficult to apply to large, dynamic hyperlinked information networks which may be too large to search exhaustively. Furthermore, the dynamic nature of such networks requires repetitively searching and updating the hyperlink index. This task involves continually accessing various network server locations which requires a significant amount of network bandwidth, computing resources, and time. In addition, standard information retrieval techniques require the user to articulate or characterize information of interest. Frequently, however, users may be able to easily recognize a document meeting their information need, but may have difficulty expressing that need explicitly in a format appropriate for the information retrieval system.

DISCLOSURE OF THE INVENTION

Thus, it is an object of the present invention to provide a system and method for retrieval of hyperlinked information resources which does not require a specific user query to locate information resources of interest.

It is a further object of the present invention to provide a system and method for retrieval of hyperlinked information resources which actively explores a hyperlinked network to present interesting resources to a user.

Another object of the present invention is to provide a system and method for retrieval of hyperlinked information resources which utilizes heuristics and relevance feedback to refine an exploration technique.

A further object of the present invention is to provide a system and method for retrieval of hyperlinked information resources which utilizes heuristics to present resources of interest to a user.

Yet another object of the present invention is to provide a system and method for retrieval of hyperlinked information resources which presents a reasonable number of relevant resources to a user.

A further object of the present invention is to provide a system and method for retrieval of hyperlinked information resources which utilizes conventional heuristic search techniques and relevance feedback but is independent of the particular heuristic techniques employed.

Yet another object of the present invention is to provide a system and method for retrieval of hyperlinked information resources which utilizes a series of ranked training examples to explore a hyperlinked network and select information resources for presentation to a user based on the training examples.

A still further object of the present invention is to provide a system and method for retrieval of hyperlinked information resources which continually adapts to changing user interests.

In carrying out the above objects and other objects and features of the present invention, a system for retrieval of hyperlinked information resources is provided which includes a user interface connected to a programmed microprocessor which is operative to explore the hyperlinked information resources using a first heuristic to select at least one information resource, to present the at least one information resource to the user via the user interface based on a second heuristic, to accept feedback from the user via the user interface, the feedback being indicative of relevance of the at least one information resource, and to modify the first and second heuristics based on the feedback.

The present invention also includes a method for retrieval of hyperlinked information resources which includes exploring the hyperlinked information resources using a first heuristic to select at least one information resource, presenting the at least one information resource to the user via a user interface based on a second heuristic, accepting feedback from the user via the user interface indicative of relevance of the at least one information resource, and modifying the first and second heuristics based on the feedback.

In one embodiment, the system and method of the present invention utilize a series of training examples each having an associated ranking to develop the first and second heuristics which may be the same, similar, or distinct heuristics. The heuristics utilize a metric indicative of the relevance of a particular resource to select and present the most relevant information to the user. The user provides feedback, such as a score or rating, for each information resource presented. This feedback is utilized to modify the heuristics so that subsequent exploration will be guided toward more desirable information resources.

The system and method of the present invention have a number of advantages over conventional information retrieval techniques applied to a hyperlinked network. For example, the present invention actively explores a hyperlinked network and presents a manageable amount (controllable by the user) of information to the user without a specific information query. Thus, the present invention selects information of interest which may have been excluded by a precisely articulated query. Furthermore, rather than inundating the user with information selected from a general, broad query, the present invention limits the amount of information presented to the user so as to minimize the time and effort required to review the information. In addition, presentation of a limited amount of relevant information, facilitates use of the present invention in mobile computing applications having limited communication bandwidth, memory, and processing resources.

Another advantage accruing to the present invention results from the ability of the system and method to automatically learn the interests of the user based on a number of ranked training examples. Once exploration and presentation heuristics are developed, the system and method may explore a hyperlinked network retrieving and presenting information resources based upon the heuristics established by the training examples. Alternatively, the system and method of the present invention are capable of continually adapting the exploration and presentation heuristics so as to accommodate changing user interests in addition to facilitating operation in a dynamic hyperlinked information environment.

The above objects and other objects, features, and advantages of the present invention will be readily appreciated by one of ordinary skill in this art from the following detailed description of the best mode for carrying out the invention when taken in connection with the accompanying drawings.

BEST MODE(S) FOR CARRYING OUT THE INVENTION

Figure 1:
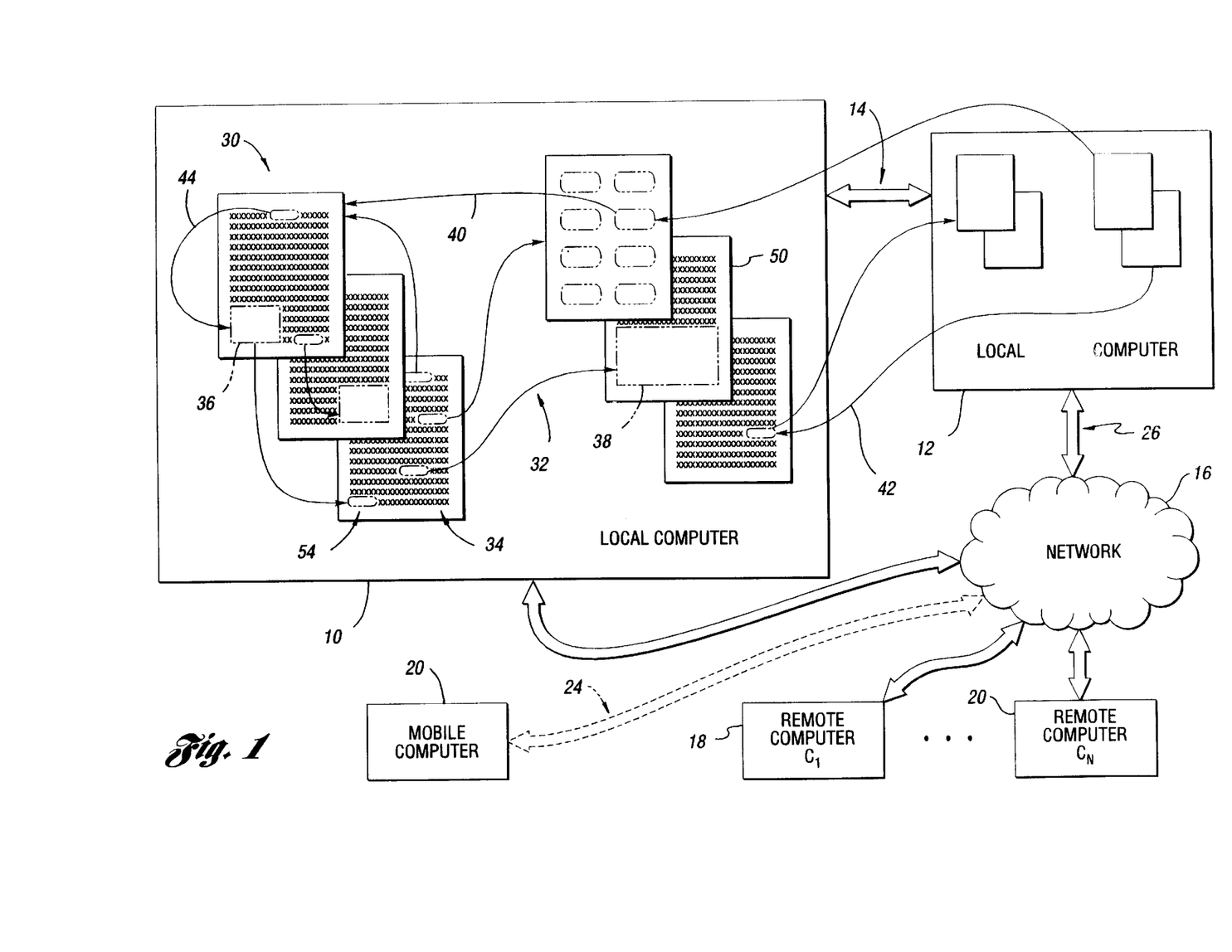
FIG. 1 is a graphical representation of an operating environment for a system and method for retrieval of hyperlinked information resources according to the present invention.

Referring now to FIG. 1, a graphical representation of a hyperlinked information resource operating environment for a system and method according to the present invention is shown. A first local computer 10 communicates with a second local computer 12 via a local communication link 14. Local communication link 14 may be a direct connection, or a networked connection via a local area network (LAN) or the like. Local computers 10 and 12 are also preferably connected to a network 16, such as the well-known internet. Similarly, remote computers, represented by computers 18 and 20 are also connected to network 16. Mobile computer 20 is connected to network 16 by a temporary communication link 24 which may be a dial-up link, satellite link, or the like. Preferably, network 16 is open-ended and accommodates addition and deletion of computers or nodes having temporary or relatively permanent communication links, such as communication link 26.

With continuing reference to FIG. 1, each computer on the network may contain information resources, indicated generally by reference numeral 30, having hyperlinks, indicated generally by reference numeral 32, to other information resources. Information resources represent various types of multimedia information, such as text 34, graphics 36, images 38, audio, and the like. An information resource may be an individual graphic, or portion of textual material, or may be an agglomeration of numerous other information resources, such as document 50. As illustrated, hyperlinks 32 may point to an information resource located on the same computer, such as hyperlink 40, to an information resource located in another computer, such as hyperlink 42, or to another portion of the same information resource, such as hyperlink 44.

Preferably, each hyperlink 32 is anchored to a particular area of an information resource, represented generally by reference numeral 54, and includes a pointer which defines the hyperlink. In one embodiment of the present invention, information resources are authored utilizing the HyperText Markup Language (HTML) and the hyperlinks are defined utilizing Uniform Resource Locators (URL's). Also in this embodiment, the HyperText Transfer Protocol (HTTP) is utilized to explore and retrieve the associated information resource specified by the URL as explained in greater detail below.

As also illustrated in FIG. 1, the physical computer network exists independently of the logical information resource network created by hyperlinks 32. Either network may change over time with the addition or deletion of physical nodes, or with the addition or deletion of logical nodes created by modifying hyperlinks. In addition to hyperlinked information transfers, network 16 accommodates a wide variety of communications between various connected computers and typically provides a large number of information resources which are not linked. Although one embodiment of the present invention is implemented utilizing the World Wide Web of the internet and its associated protocols, the present invention transcends the particular physical computer network and the particular implementation of the logical network created by the hyperlinks. Thus, the system and method of the present invention may be utilized with various other protocols other than HTML, HTTP, TCP/IP (Transmission Control Protocol/Internet Protocol), URL's, and the like.

Figure 2:
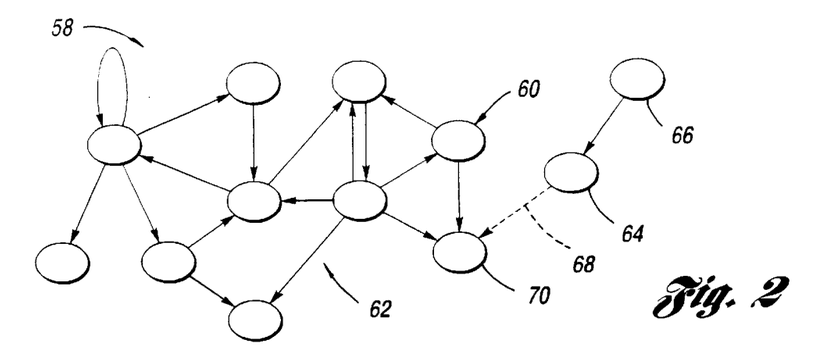
FIG. 2 is a directed graph representation of a hyperlinked information resource operating environment for a system and method for retrieval of hyperlinked information resources according to the present invention.

Referring now to FIG. 2, a directed graph representation of a logical network created by various hyperlinked information resources is shown. This logical network, indicated generally by reference numeral 58, includes a number of nodes 60, representing information resources, connected by various hyperlinks 62. Nodes 64 and 66 are added to the logical network 58 via a hyperlink 68 to node 70. Thus, the logical network may continually change over time as hyperlinks are created, modified, and destroyed. Similarly, the information within a particular node 60 may be modified or deleted. As illustrated, nodes 60 may have a single, one-way link, or may have multiple links to one or more nodes. Traditional information search and retrieval techniques often utilized various indexes to track the addition and deletion of nodes to the physical and logical networks. However, these techniques do not detect modification of a previously indexed information resource. Furthermore, addition and deletion of nodes is only updated periodically, or when the addition or deletion is reported to a central tracking location, due to the significant computational resources required.

Figure 3:
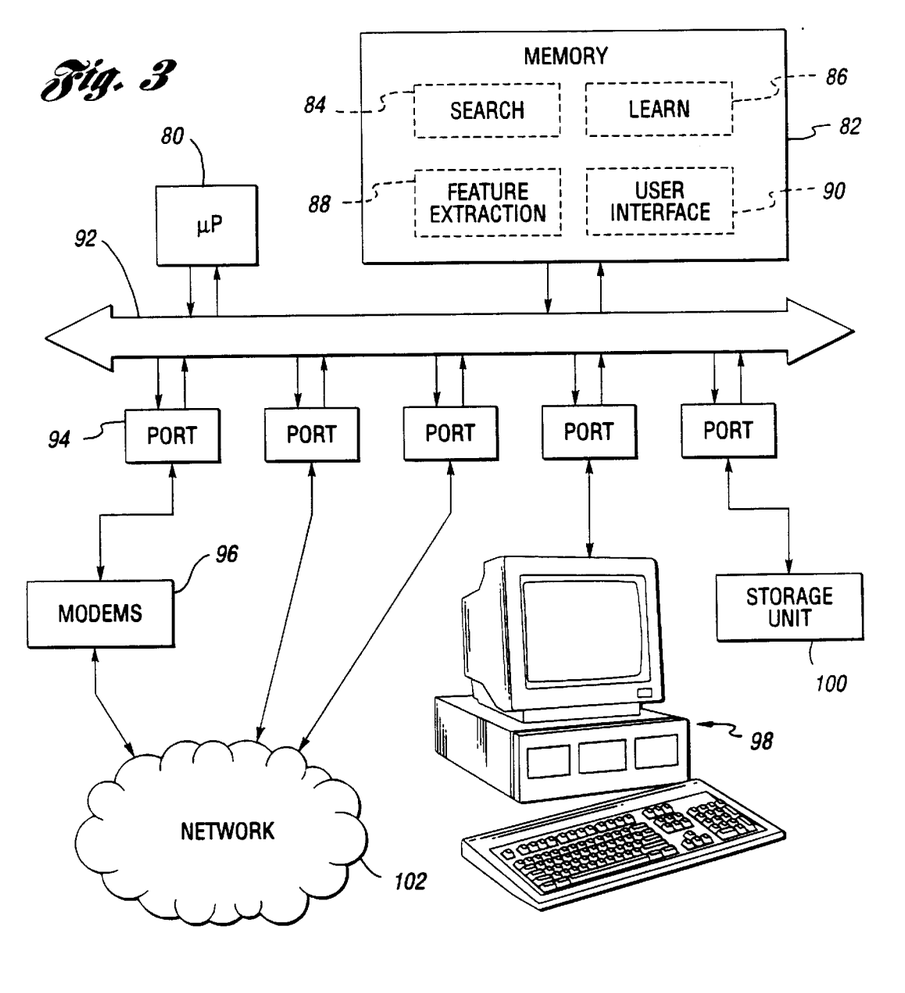
FIG. 3 is a block diagram of a system for retrieval of hyperlinked information resources according to the present invention.

Referring now to FIG. 3, a block diagram of a representative system for retrieval of hyperlinked information according to the present invention is shown. The system includes a microprocessor 80 and a memory 82 in communication with a control and data bus 92. A number of ports 94 facilitate input and output to and from the microprocessor 80 and are in communication with various devices such as modems 96, user interface 98, and storage unit 100. Storage unit 100 represents any of a variety of conventional long-term storage media such as magnetic media, optical media, or the like. Ports 94 and modems 96 are preferably in communication with a network 102, such as networks 16 and 58 illustrated and described with reference to FIGS. 1 and 2, respectively.

In operation, program instructions and logic rules stored in memory 82 and/or in storage unit 100 are executed by microprocessor 80. The logic rules may implement various functions as represented by a search module 84, a learning module 86, a feature extraction module 88, and a user interface module 90. Execution of the logic rules and program instructions by microprocessor 80 is operative to explore hyperlinked information resources within storage unit 100, or on other computers accessed via network 102. Memory 82 and/or storage unit 100 contain logic rules which define a first heuristic utilized to explore the hyperlinked information resources as explained in greater detail with reference to FIGS. 4 and 5. The first heuristic explores the various nodes of the logical network and selects at least one information resource for presentation to a user. Microprocessor 80 then controls presentation of selected resources according to a second heuristic defined by logic rules also contained within memory 82 and/or storage unit 100. The first and second heuristics may be the same, similar, or entirely different, depending upon the particular operating environment and the structure of the physical and logical networks, as explained in greater detail with reference to FIGS. 4 and 5. The user provides feedback indicative of the degree of relevance of the presented information via user interface 98 in the form of a rating, score, or binary parameter, such as yes/no, good/bad, or the like. Microprocessor 80 is then operative to modify the first and/or second heuristics by modifying the structure of the logic rules or variables stored in memory 82 and/or storage unit 100.

With continuing reference to FIG. 3, microprocessor 80 may continue to execute various logic rules to explore the hyperlinked information resource network without intervention from the user. The microprocessor 80 may continue until interrupted, or may halt operation after a predetermined number of information resources have been selected, or after a predetermined time period, or a predetermined computational period, etc.

Figure 4:
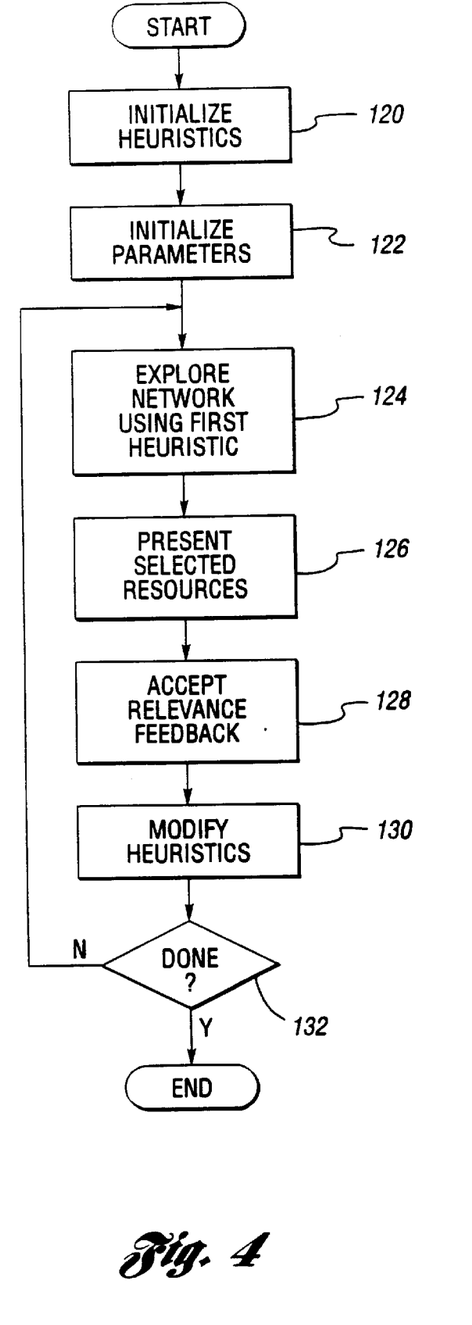
FIG. 4 is a flow chart illustrating operation of a system and method for retrieval of hyperlinked information according to the present invention.

Referring now to FIG. 4, a flow chart is shown illustrating operation of a system and method for retrieval of hyperlinked information resources according to the present invention. It should be recognized that the flow charts presented in FIGS. 4 and 5 to describe the present invention, depict sequential processing, although any of a number of processing strategies could be utilized without departing from the spirit or scope of the present invention. For example, if the control logic is implemented in hardware, many of the method steps may be performed simultaneously or nearly simultaneously. Similarly, an interrupt driven processing strategy could also be utilized to achieve the objects and advantages of the present invention. One of ordinary skill in the art will also recognize that the concepts of the present invention may obviously be extended to a corresponding parallel implementations without departing from the spirit or the scope of the present invention. Similarly, a combined sequential/parallel implementation utilizing hardware and/or software to accomplish one or more of the objects and advantages of the present invention is within the contemplation of the present invention.

The exploration and presentation heuristics are initialized at step 120 of FIG. 4. This step may include specifying the actual heuristics to be utilized during subsequent exploration. Preferably, the heuristics used are those based on discrete features which are amenable to adaptation using techniques from machine learning. For example, the heuristic may identify several features, each feature taking values from a given scale. The ranking scale may be a simple binary scale, such as yes/no, or a scale with a number of gradations, such as a numeric scale, or a scale with values such as poor, good, better, best, etc. For example, in one embodiment of the present invention operating in the Web environment, the input to the heuristics initialization, i.e. the training examples, consists of 20 information resources each having a ranking between zero and ten indicative of their relevance or "interestingness" to the user. The output of the initialization process would be a function that takes any Web information resource and returns a ranking within the range of zero to ten. The exploration and presentation heuristics are then based on these ranking functions. Preferably, the heuristics developed based on the training examples continually adapt to the user's interests as determined by the user feedback, described below. Alternatively, once the heuristics are developed, the system may continue to explore the network and present results using those heuristics until the system is reinitialized and a new set of training examples are presented.

The user may also enter a specific or general query at block 120, or select an information resource of interest to initialize the heuristics. Alternatively, a null query indicates that the system should simply start exploring and use subsequent presentation and relevance feedback to shape the heuristics and determine which information resources to present to the user.

Heuristic search techniques are well established in the artificial intelligence art. Since the present invention is independent of the actual heuristics utilized for exploration of the hyperlinked network, and presentation of information resources to the user, any of a number of known heuristic techniques may be employed in addition to those based on machine learning techniques.

With continuing reference to FIG. 4, various system parameters are selected at block 122. These may include a fixed number of resources to present to the user, the amount of time for the system to explore the network before returning results, the initial node to begin exploration, and how often to revisit nodes which have been previously searched, among others. Block 124 begins exploring the hyperlinked network using the exploration heuristic established at block 120 or as subsequently modified by the system. The exploration process selects information resources which appear "interesting" or relevant as determined by the exploration heuristic. The exploration process may be repeatedly executed to locate interesting information resources as determined by the system parameters and explained in greater detail with reference to FIG. 5.

Block 126 of FIG. 4 presents selected information resources to the user based on a presentation heuristic. The presentation heuristic may be the same, similar to, or different from the exploration heuristic. For example, if the heuristics are the same, the system functions as if there were only one heuristic and presents all of the information resources selected by the exploration heuristic to the user. The user provides relevance feedback to the system via a user interface for each of the information resources presented at block 128. This feedback may be actively or passively acquired. For example, active feedback would require the user to enter some indication of the relevance of the currently presented information resource into the system. This feedback could be on an established scale with a limited number of gradations, or a numeric scale, as explained above. Passive feedback may be acquired by monitoring the response of the user during presentation of the selected information resources. For example, the length of time which elapses while viewing a particular information resource is somewhat indicative of how interesting that information resource is to the user, with longer elapsed times corresponding to more interesting information resources.

The presentation and/or exploration heuristics are modified at block 130 of FIG. 4 based on the selected resources and the active and/or passive feedback received from the user as represented by block 128. This block represents the learning component of the system and method of the present invention since the system automatically learns the preferences of the user and uses this knowledge during subsequent exploration. Thus, the system and method continually adapt to accommodate changing user interests related to exploration, or the manner of presentation of selected resources. Any of a number of learning methods may be utilized such as neural network techniques, nearest neighbor techniques, or various other adaptive strategies. In general, the speed of adaptation of the heuristics to select more relevant information resources is a function of the number and variety of information resources presented to the user. Thus, if the user prefers to review a large number of selected information resources as determined by block 122, the heuristics may be refined more quickly than if relevance feedback is provided for only a small number of selected information resources. Similarly, if all of the selected and presented information resources are substantially similar and are rejected by the user, the heuristics will have difficulty determining which feature of the selected information resources is being rejected.

With continuing reference to FIG. 4, once the heuristics are modified, as represented by block 130, block 132 determines if the process should continue or terminate. As previously described, the determination of block 132 may be based on a predetermined number of selected resources, a predetermined time, an interrupt generated by the user or the system, etc. Depending on the determination of completion represented by block 132, the process terminates or repeats with block 124.

Figure 5:
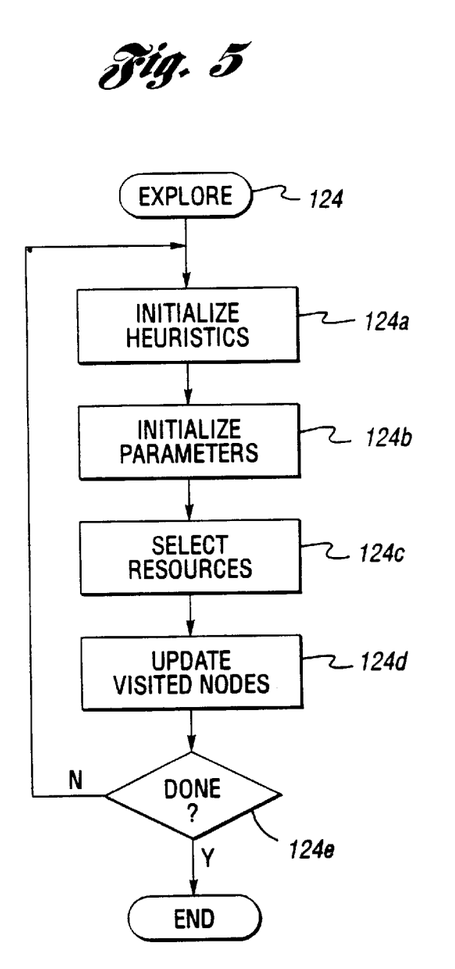
FIG. 5 is a flow chart illustrating the exploration function of a system and method for retrieval of hyperlinked information according to the present invention.

Referring now to FIG. 5, a flow chart illustrating the exploration process of a system and method for retrieval of hyperlinked information is shown. As explained above, the present invention utilizes any of a number of established heuristic search techniques to explore a hyperlinked information resource network. For example, a best-first strategy with a resource limit to restrict the number of information resources accessed during each cycle may be implemented. Alternatively, a limited-breadth search, similar to a best-first iterative broadening technique, would allow faster coverage of a broader search space. Iterative broadening techniques are discussed by M. L. Ginsberg and W. D. Harvey, Iterative Broadening, *Proceedings of the 8th National Conference on Artificial Intelligence*, pp. 216–220, 1990.

Block 124a of FIG. 5 selects at least one node having an information resource. This node may be specified by the user during initialization, or generated by the system by following hyperlinks and keeping track of previously visited nodes. Once an information resource is located, the system extracts some features of the information resource as represented by block 124b. The extracted feature or features are used to evaluate the search heuristic and to provide a basis for the learning component which modifies the heuristics. A metric commonly used in the field of information retrieval may be used by the present invention to determine how interesting a particular resource will be to the user. Examples of such techniques are discussed in detail by Gerard Salton and Michael J. McGill, *An Introduction to Modern Information Retrieval*, McGraw-Hill, 1983.

In one embodiment of the present invention, a metric such as the product of term frequency and inverse document frequency (TFIDF) is used. The value of an object k (such as a word) in a resource i (such as a document) is given by:

$$VALUE_{ik} = FREQ_{ik} * [log_2(n) - log_2(DOCFREQ_k) + 1]$$

where $FREQ_{ik}$ represents the number of times object k occurs in resource i, $DOCFREQ_k$ represents the number of resources in which object k occurs, and n represents the total number of resources. This measure may be used to extract the best objects from each resource to add to a current set of interesting objects K, and this in turn may be the set of features used by the learning subsystem. The search heuristic h for an information resource i can be expressed as:

$$h_i = \sum_{k \in K \cap i} w_k$$

where $W = \{w_1 \ldots w_{|K|}\}$ represents a set of weights for the objects in K. Thus, the current interests of the user are represented by the sets K and W.

Of course, any of a number of other features may be utilized to characterize a particular information resource and to evaluate its probable relevance to the user. For example, structural features, such as the length of a document, the number of pictures it contains, or when it was last updated, may be used to evaluate how interesting the document will be to the user. In one embodiment of the present invention, words used within HTML tags are rated higher than other words. For example, in HTML, embedded codes are used to structure the information. Thus, a word to be emphasized may be encoded as "<E>emphasize</E>" which the system and method of the present invention would interpret to be more indicative of the content of the resource. Similarly, if a word appears in a heading, it is rated higher than if it is found in the middle of a sentence. A higher rating corresponds to a higher weight in evaluating the search heuristic.

Information resources that appear to be interesting based on the extracted feature or features are selected for subsequent presentation to the user as represented by block 124c. Typically, only the location of the selected information resource is stored to conserve storage resources. During presentation to the user, the information resource is retrieved and displayed via the user interface. However, due to the rapidly changing nature of information resources on the Web, the selection process may retrieve the information resource by copying it to the local processor storage unit for later presentation to the user. Block 124d keeps track of the visited nodes including an optional time stamp so that these nodes can be selectively revisited in the future depending upon the system parameters. Even though there is not necessarily any correlation between nearby information resources and common subject matter, it is often beneficial to explore nodes with higher heuristic values. Similarly, these nodes may be periodically revisited since related information resources of interest are likely to be added.

Block 124e of FIG. 5 determines whether to continue the exploration process or to terminate the exploration process and continue with block 126 of FIG. 4. Similar to block 132 of FIG. 4, block 124e of FIG. 5 may base this determination upon any of a number of predetermined or adaptive parameters specified by the user or determined by the system and method of the present invention, respectively.

An actual implementation of the present invention was performed. The system was run in discrete cycles spread out over about three weeks. The behavior of one cycle can be summarized as follows:

(a) Search the web, using some search heuristic, taking a bounded amount of time;
(b) Select the best p pages to present to the user, using some selection heuristic (which may be the same as the search heuristic);
(c) Receive an evaluation from the user for each page presented; and
(d) Update the search and selection heuristics according to this feedback.

One cycle was run per user per day, so that each user had a new page of output each day. The system was written in a mixture of Python and C++.

Features were extracted from each page found in order to provide a basis for computing the search heuristic. The approach taken was to extract a fixed number of keywords from each document; the users' interests were represented with keywords and associated weights.

A vector space information retrieval paradigm was utilized in which each of the documents were represented as vectors. A dictionary vector $\vec{D}$ was assumed, where each element $d_i$ was a word. Each document then had a Vector $\vec{V}$, where element $v_i$ was the weight of word $d_i$ for that document. If the document did not contain $d_i$ then $v_i=0$.

In a typical information retrieval setting, an inverted index is created from a collection of documents. Particular documents can be retrieved based on a similarity measure between the document vector and a query vector, often just the angle between them. In the present framework, the query vector was analogous to the system's model of the user, which was designated $\vec{M}$. The score for a page was calculated by measuring how well it matched the model, which was a comparison between the page's vector and $\vec{M}$.

In order to create the vector representation of a web page, the page was parsed to extract individual words (ignoring HTML mark-up tags), to remove stop words (words so common as to be useless as discriminators, like "the"), and to stem the remainder of the words. "Stemming" reduces words to their "stems" and diminishes redundancy. For example, "computer," "computers," "computing" and "computability" all reduce to "comput." For this the Porter suffix-stripping algorithm was utilized, as disclosed in M. F. Porter, "An Algorithm For Suffix Stripping," PROGRAM 14(3): 130–37, July 1980, and as implemented in Frakes, W. B. Frakes, Stemming Algorithms, INFORMATION RETRIEVAL DATA SOURCES AND ALGORITHMS, pp. 131–160 (Prentiss Hall 1992).

The word weights were calculated using a TFIDF scheme, normalizing for document length as set forth in Salton and Buckley, "Term Weighing Approaches In Automatic Text Retrieval," Tech. Rep. 87–881, Cornell Univ., Feb. 1988. The weight $v_i$ of a word $d_i$ in a document T is given by:

$$v_i = \frac{\left(0.5 + 0.5 \frac{tf(i)}{tf_{max}}\right)\left(\log \frac{n}{df(i)}\right)}{\sqrt{\sum_{d_j \in T}\left(\left(0.5 + 0.5 \frac{tf(j)}{tf_{max}}\right)^2 \left(\log \frac{n}{df(j)}\right)^2\right)}}$$

where tf(i) is the number of times word $d_i$ appears in document T (the term frequency), df(i) is the number of documents in the collection which contain $d_i$ (the document frequency), n is the number of documents in the collection and $tf_{max}$ is the maximum term frequency over all words in T.

The document frequency component was calculated using a fixed dictionary of approximately 27,000 words gathered from the web and then stemmed. The ten highest-weighted words in a document vector were included for computational reasons.

A best-first search was utilized. The search heuristic evaluated a score for each page by taking the dot product $\vec{V}.\vec{M}$, where $\vec{V}$ represents the page and $\vec{M}$ the current model of the user. (Since in this search an exclusive-or function cannot be learned, an alternate implementation would be to consider bigrams, i.e. pairs of consecutive words.)

In the present implementation, only plain text or HTML pages were considered. A proxy HTTP server provided uniform access to pages which were provided using different protocols (e.g. Gopher, WAIS, Usenet news, FTP).

When the search had utilized its allocated time, the p highest scoring pages found according to the selection heuristic were outputted. This primarily used the scores from the search heuristic, but in addition attempted to ensure a better mixture of pages by selecting at most one from each site. (If a page scored very highly, it is likely that related pages at the same site would also score highly.) A second check performed prevented the user from seeing the same page twice.

Each page $\vec{V}$ was viewed by the user and received an evaluation $e_i$ (an integer in the range [−5, +5]). Given this information the weights of $\vec{M}$ were updated by addition:

$$\vec{M} \leftarrow \vec{M} + \sum_{i=1}^{p} e_i \vec{V}_i$$

This supplied the relevance feedback to the system.

The system was accessed through HTML forms. In this manner, the system was usable from any point on the Internet, merely requiring an appropriate browser.

The evaluation scores given by the users were recorded daily. The results of the pages produced by the present system were compared with both human-selected and randomly selected pages. Each day a separate process took six pages produced by the system, three random pages and one human-selected page, and presented them to the user in a random order. (In that way it could not be determined from where each page came.) The evaluations received for each of the three sources were recorded and compared.

After the first couple of days, the performance of the preset system was consistently better than the randomly-selected pages. It also out-performed the human-selected page one-half of the time. (The greater variability in the score for the human-selected page was possibly due to the fact that only a single page was selected.) Over the duration of the implementation, the results stayed fairly constant.

In alternate embodiments, the selection heuristic could be changed. For example, rather than selecting all six pages from the tallest peak in the feature space, only one document could be selected from the region of each peak. Also, for operation over long periods of time, a weight decay function could be utilized. Further, the search engine could be replaced with a keyword lookup on one of the existing web indexes (e.g. the Lycos system); this would significantly reduce the computational and network cost, although it might compromise viewing the most up-to-date information.

In addition, the system could be accessed and used by a group of users having shared interests. This could reduce duplicate searching. Further, since some of the main beneficiaries of the present invention may be users of mobile computers which are linked to wireless networks, a textual e-mail based interface to the system could be provided. Also, the large information space accessed should be condensed to minimize communications bandwidth and screen space.

Thus, it is understood, that while the forms of the invention herein shown and described include the best mode contemplated for carrying out the invention, they are not intended to illustrate all possible forms thereof. It will also be understood that the words used are descriptive rather than limiting, and that various changes may be made without departing from the spirit and scope of the invention disclosed.

What is claimed is:

1. A system for retrieval of hyperlinked information resources, the system comprising:
    a user interface for selecting system parameters, for providing system output to a user, and for accepting input from the user;
    a processor in communication with the user interface, the microprocessor being operative to explore the hyperlinked information resources using a first heuristic to select at least one information resource, to present the at least one information resource to the user via the user interface based on a second heuristic, to obtain feedback from the user via the user interface corresponding to a period of time during which the user views each of the at least one information resources to determine relevance of the at least one information resource, and to modify the first and second heuristics based on the feedback.

2. The system of claim 1 further comprising a memory accessible by the processor, wherein the memory contains the first and second heuristics and logic rules operative to modify the first and second heuristics upon execution of the logic rules by the processor.

3. The system of claim 1 wherein the processor is further operative to evaluate a metric which characterizes relevance of at least one information resource in order to select the at least one information resource for presentation to the user.

4. The system of claim 1 wherein the processor is further operative to characterize relevance of at least one information resource containing a plurality of objects in order to select the at least one information resource by evaluating the expression:

$$VALUE_{ik} = FREQ_{ik} * [log_2(n) - log_2(DOCFREQ_k) + 1]$$

where $FREQ_{ik}$ represents the number of times object k occurs in resource i, $DOCFREQ_k$ represents the number of resources in which object k occurs, and n represents the total number of resources.

5. The system of claim 1 wherein the processor is operative to obtain feedback from the user by monitoring a parameter indicative of relevance of the at least one information resource presented to the user.

6. The system of claim 1 wherein the processor is operative to repeatedly explore the hyperlinked information resources until interrupted by the user.

7. The system of claim 1 wherein the processor is operative to select a predetermined number of information resources for presentation to the user.

8. The system of claim 1 wherein the processor is operative to obtain numerical feedback from the user.

9. The system of claim 1 wherein the processor is operative to extract at least one feature of the at least one information resource, the feature being indicative of relevance of the resource to the user.

10. The system of claim 9 wherein the at least one feature is a structural feature of the at least one information resource.

11. The system of claim 10 wherein the at least one feature includes length of each of the at least one information resource.

12. The system of claim 10 wherein the at least one feature includes number of pictures contained within the at least one information resource.

13. The system of claim 1 wherein the processor is further operative to repeatedly modify at least one of the first and second heuristics so as to accommodate changing interests of the user represented by changing indications of relevance from the user.

14. The system of claim 1 wherein the processor is further operative to obtain a value for each of at least one system parameter which determines how many selected information resources to present to the user.

15. The system of claim 1 wherein the processor is further operative to automatically determine at least one of the first and second heuristics based on a predetermined number of training examples ranked by the user wherein each rank indicates the relevance of an associated training example.

16. The system of claim 15 wherein the processor is operative to modify at least one of the first and second heuristics only during an initial training period, the initial training period being followed by a use period during which the first and second heuristics are not modified.

17. A method for retrieval of hyperlinked information resources, the method comprising:
    exploring the hyperlinked information resources using a first heuristic;
    selecting at least one information resource based on the first heuristic;
    presenting the at least one information resource to a user via a user interface based on a second heuristic;
    obtaining feedback from the user via the user interface corresponding to a period of time during which the user views each of the at least one information resources to determine relevance of the at least one information resource; and
    modifying at least one of the first and second heuristics based on the feedback.

18. The method of claim 17 wherein the step of modifying comprises modifying at least one of the first and second heuristics based on the feedback and the at least one information resource.

19. The method of claim 17 further comprising:
    selecting system parameters via the user interface prior to exploring the hyperlinked information resources.

20. The method of claim 19 wherein selecting system parameters comprises selecting a predetermined number to determine how many selected information resources to be presented by the system to the user.

21. The method of claim 17 further comprising:
    repeating the steps of exploring, selecting, presenting, obtaining, and modifying until interrupted by the user.

22. The method of claim 17 wherein the step of selecting at least one information resource comprises:
    selecting at least one information resource containing at least one object based on evaluation of the expression:

$$VALUE_{ik} = FREQ_{ik} * [log_2(n) - log_2(DOCFREQ_k) + 1]$$

where $FREQ_{ik}$ represents the number of times object k occurs in resource i, $DOCFREQ_k$ represents the number of resources in which object k occurs, and n represents the total number of resources.

23. The method of claim 17 wherein the step of obtaining feedback from the user comprises:
   monitoring a parameter indicative of relevance of the at least one information resource presented to the user.

24. The method of claim 17 wherein the step of selecting at least one information resource comprises:
   extracting at least one feature of the at least one information resource, the feature being indicative of relevance of the resource to the user.

25. The method of claim 24 wherein extracting at least one feature comprises extracting at least one structural feature of the at least one information resource.

26. The method of claim 25 wherein extracting at least one structural feature comprises extracting length of each of the at least one information resource.

27. The method of claim 17 wherein the step of modifying is repeatedly performed so as to accommodate changing interests of the user represented by changing indications of relevance from the user.

28. The method of claim 17 further comprising:
   automatically determining at least one of the first and second heuristics based on a predetermined number of training examples having an associated ranking determined by the user wherein each ranking indicates relevance of the associated training example to the user.

29. The method of claim 17 wherein the step of modifying at least one of the first and second heuristics is performed only during an initial training period, the initial training period being followed by a use period during which the first and second heuristics are not modified.

30. A method for retrieval of hyperlinked information resources in an environment including a plurality of computers wherein each of the plurality of computers communicates with at least one other computer and wherein at least one of the plurality of computers contains a plurality of information resources having associated hyperlinks which define a hyperlinked network, the method comprising:
   exploring the hyperlinked network using a first heuristic, wherein the first heuristic characterizes relevance of at least one information resource on the hyperlinked network;
   selecting at least one information resource based on the associated relevance as determined by the first heuristic;
   presenting the at least one information resource to a user via a user interface based on a second heuristic, wherein the second heuristic filters the at least one information resource so as to present a limited number of information resources;
   obtaining feedback from the user via the user interface, the feedback indicative of actual relevance of the at least one information resource to the user based on at least length of time during which the user views each of the at least one information resource; and
   modifying at least one of the first and second heuristics based on the feedback and the at least one information resource.

31. The method of claim 30 wherein the first heuristic is based on a series of training examples including an information resource with an associated ranking indicative of relevance to the user.

32. The method of claim 30 wherein the first and second heuristics are substantially similar.

33. The method of claim 30 further comprising:
   repeating the steps of exploring, selecting, presenting, obtaining, and modifying until interrupted by the user.

34. The method of claim 30 wherein the step of selecting at least one information resource comprises:
   selecting at least one information resource containing at least one object based on evaluation of the expression:

$$VALUE_{ik} = FREQ_{ik} * [log_2(n) - log_2(DOCFREQ_k) + 1]$$

where $FREQ_{ik}$ represents the number of times object k occurs in resource i, $DOCFREQ_k$ represents the number of resources in which object k occurs, and n represents the total number of resources.

35. A system for retrieval of hyperlinked information resources, the system comprising:
   a user interface for selecting system parameters, for providing system output to a suer, and for accepting input from a user;
   a processor in communication with the user interface, the processor being operative to explore the hyperlinked information resources using a first heuristic to select at least one information resource, to extract at least one feature from the at least one information resource including a number of pictures within the resource, to present the at least one information resource to the user via the user interface based on the second heuristic, to obtain feedback from the user via the user interface, the feedback being indicative of relevance of the at least one information resource including an indication of a period of time during which the user views the least one information resources, and to modify the first and second heuristics based on the feedback.

36. A method for retrieval of hyperlinked information resources, the method comprising;
   exploring the hyperlinked information resources using a first heuristic, the first heuristic including a metric for evaluating a number of pictures within the hyperlinked information resources;
   selecting at least one information resource based on the first heuristic;
   presenting the at least one information resource to a user via a user interface based on a second heuristic;
   obtaining passive feedback from the user via the user interface indicative of relevance of the at least one information resource; and
   modifying at least one of the first and second heuristics based on the feedback.

37. The method of claim 36 wherein the step of obtaining passive feedback from the user comprises:
   monitoring a parameter indicative of relevance of the at least one information resource presented to the user.

38. The method of claim 36 wherein the step of obtaining passive feedback from the user comprises:
   recording a value representing a period of time during which the user views each of the at least one information resources.

* * * * *

UNITED STATES PATENT AND TRADEMARK OFFICE
CERTIFICATE OF CORRECTION

PATENT NO. : 5,855,015
DATED : December 29, 1998
INVENTOR(S) : YOAV SHOHAM

It is certified that error appears in the above-identified patent and that said Letters Patent is hereby corrected as shown below:

Col. 16, Line 22, Claim 35, replace "suer" with – user – .

Signed and Sealed this

Fourteenth Day of September, 1999

Attest:

Q. TODD DICKINSON

Attesting Officer     Acting Commissioner of Patents and Trademarks